US006643813B1

(12) United States Patent
Johansson et al.

(10) Patent No.: US 6,643,813 B1
(45) Date of Patent: Nov. 4, 2003

(54) METHOD AND APPARATUS FOR RELIABLE AND EFFICIENT DATA COMMUNICATIONS

(75) Inventors: Mathias Johansson, Sollentuna (SE); Christiaan Roobol, Hässelby (SE); Johan Larsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/249,902

(22) Filed: Feb. 17, 1999

(51) Int. Cl.[7] .............................. G08C 25/02; H04L 1/18
(52) U.S. Cl. ...................... 714/748; 375/295; 375/316; 370/346
(58) Field of Search .................. 714/748, 749–771, 714/746, 747, 799; 713/201; 705/1, 14, 53, 37, 80, 51, 52, 57; 380/201; 375/295, 316; 370/321, 346, 349; 455/424, 560

(56) References Cited

U.S. PATENT DOCUMENTS

| 5,677,918 | A | * | 10/1997 | Tran et al. ................. 370/321 |
| 5,841,764 | A | | 11/1998 | Roderique et al. |
| 6,237,786 | B1 | * | 5/2001 | Ginter et al. ............... 213/153 |
| 6,253,193 | B1 | * | 6/2001 | Ginter et al. ................. 705/52 |
| 6,363,488 | B1 | * | 3/2002 | Ginter et al. ................. 705/14 |
| 6,389,402 | B1 | * | 5/2002 | Ginter et al. ............... 380/201 |
| 6,427,140 | B1 | * | 7/2002 | Ginter et al. ................. 705/53 |

FOREIGN PATENT DOCUMENTS

EP    0 695 053    1/1996

OTHER PUBLICATIONS

Nannicini, S.; Pecorella, T., Universal Personal Communications, 1998. ICUPC '98. IEEE 1998 International Conference on , Vol: 2 , 1998 Page(s): 1241–1245 vol. 2.*

* cited by examiner

Primary Examiner—Albert Decady
Assistant Examiner—Guy Lamarre
(74) Attorney, Agent, or Firm—Nixon & Vanderhye, PC

(57) ABSTRACT

The reliability of data communication by is improved analyzing plural data units in a group or a block rather than analyzing individual data units. For example, at the time that a transmitter desires or needs to send a polling request to a receiver, there may be more than one data unit available for delivery as a group. The polling fields of all the data units in this group are set to indicate a poll request. When the receiver receives this group of data units, it sends the requested status information to the transmitter if the polling field of at least one of the received data units in the group indicates a poll request. Moreover, the receiver sends the requested status information only once. Those other polling fields may be used to increase the reliability of the transmission.

22 Claims, 5 Drawing Sheets

SAMPLE PDU

| U/C | P | Sequence Number | | Octet 1 |
|---|---|---|---|---|
| Sequence Number | | | E | Octet 2 |
| Length Indicator | | | E | Octet 3 (Optional) |
| ⋮ | | | | |
| Length Indicator | | | E | Octet L (Optional) |
| Data | | | | |

SACK PDU

| U/C | LRSN | | Octet 1 |
|---|---|---|---|
| LRSN | | E | Octet 2 |
| SSN | | | Octet 3 (Optional) |
| SSN | Bitmap | | |
| Bitmap | | | Octet L (Optional) |

METHOD AND APPARATUS FOR RELIABLE AND EFFICIENT DATA COMMUNICATIONS

FIELD OF THE INVENTION

The present invention relates to packet data communications, and in particular, to a method and apparatus for both reliable and efficient packet data communications.

BACKGROUND AND SUMMARY OF THE INVENTION

Data packet communications are typically "best effort" packet delivery systems. Best effort delivery makes an earnest attempt to deliver the packets, i.e., it does not discard them capriciously. Indeed, data packet services are typically called unreliable because the delivery is not guaranteed, i.e., packets may be lost, duplicated, delayed, or delivered out of order.

Nevertheless, many data communications applications require or at least benefit from a greater degree of reliability. One way of increasing the reliability of transmission is for two communications units to exchange an acknowledgment message so they know if and when a particular message has been transferred successfully. A protocol that uses positive and/or negative acknowledgments with retransmission techniques to increase reliability is typically referred to as automatic repeat request (ARQ). A transmitter sends data units to a receiver. The receiver replies by sending back to the transmitter a positive acknowledgment if a data unit is properly received. A negative acknowledgment is sent if a data unit is not properly received, i.e., a data unit received with errors (or at least too many errors to correct efficiently) or a data unit simply not received. In a negative acknowledgment situation, the receiver then sends a request to the transmitter to retransmit those data units that were not properly received.

Packets may include some type of polling or status inquiry field. If the transmitter sends a polling request to the receiver by setting one or more bits in the polling field, the receiver upon receiving the poll request sends receiver status information to the transmitter, e.g., an acknowledgment that packet was properly received.

As noted above, data packet services are typically unreliable and packets may be considerably delayed or even lost. In these situations, there is a considerable time period before this packet delay or packet loss is detected by the transmitter. Once this is detected, the transmitter must belatedly retransmit that packet. All of this results in significant delays in transmission, and ultimately, a lower effective data throughput.

It is an object of the present invention to overcome these problems by providing more reliable but still efficient packet data communications.

It is another object of the present invention to provide this increased reliability without adding additional complexity or overhead to the data packet transmissions.

It is another object of the invention to increase the reliability of data communications using one or more data bits, and if possible, one or more data fields in data packets which carry no, little, or obsolete information.

The present invention improves the reliability of data communication by analyzing plural data units in a group or a block rather than analyzing individual data units. For example, at the time that a transmitter desires or needs to send a polling request to a receiver, there may be more than one data unit available for delivery as a group. All of the polling fields of the data units in this group are set to indicate a poll request. When the receiver receives this group of data units, it sends the requested status information to the transmitter if the polling field of at least one of the received data units in the group indicates a poll request. Even if the polling field of plural ones of the data units in the group indicates a polling request, the receiver sends the requested status information only once.

Rather than not using the polling fields of the other data units in the group, which is effectively wasted bandwidth, the present invention employs those other polling fields to increase the reliability of the transmission. This improved reliability results in decreased transmission delay from the transmitter to the receiver. Further, the additional polling fields (or other additional fields) may be used to detect or otherwise correct errors that would otherwise be undetected or uncorrectable if only a single data unit were processed individually.

A preferred example embodiment of the present invention is disclosed in the context of a wideband code division multiple access (WCDMA) radio communications system. In this example, the invention is carried out in an automatic repeat and request technique implemented at a radio link control (RLC) communications protocol layer. This invention is particularly advantageous in this environment because packet data transmissions over a radio channel are susceptible to fading, dispersion, and noise making the enhanced reliability provided by the present invention particularly advantageous.

The invention is also generally applicable to PDU fields other than polling fields. The transmitter reliably and efficiently ensures the receiver accurately receives particular information by sending that information in an otherwise unused PDU field of plural PDUs transmitted as a group. The likelihood that the receiver will properly receive the particular information from at least one of the PDUs in the group is quite high. Since the information occupies what would have been otherwise one or more unused PDU fields, the redundancy and increased reliability do not add further "cost" to the transmission.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, data flows, signaling implementations, protocols, techniques, etc., in order to provide an understanding of the present invention. However, it will be apparent to one skilled in the art that the present invention may be practiced in other embodiments that depart from these specific details. For example, while the present invention is disclosed as being implemented in the context of data packet acknowledgment at a particular layer of a communication protocol stack, i.e., the link layer, those skilled in the art will appreciate that the present invention can be implemented in other contexts and at other layers as well. In other instances, detailed descriptions of well-known methods, interfaces, devices, and signaling techniques are omitted so as not to obscure the description of the present invention with unnecessary detail.

Figure 1:
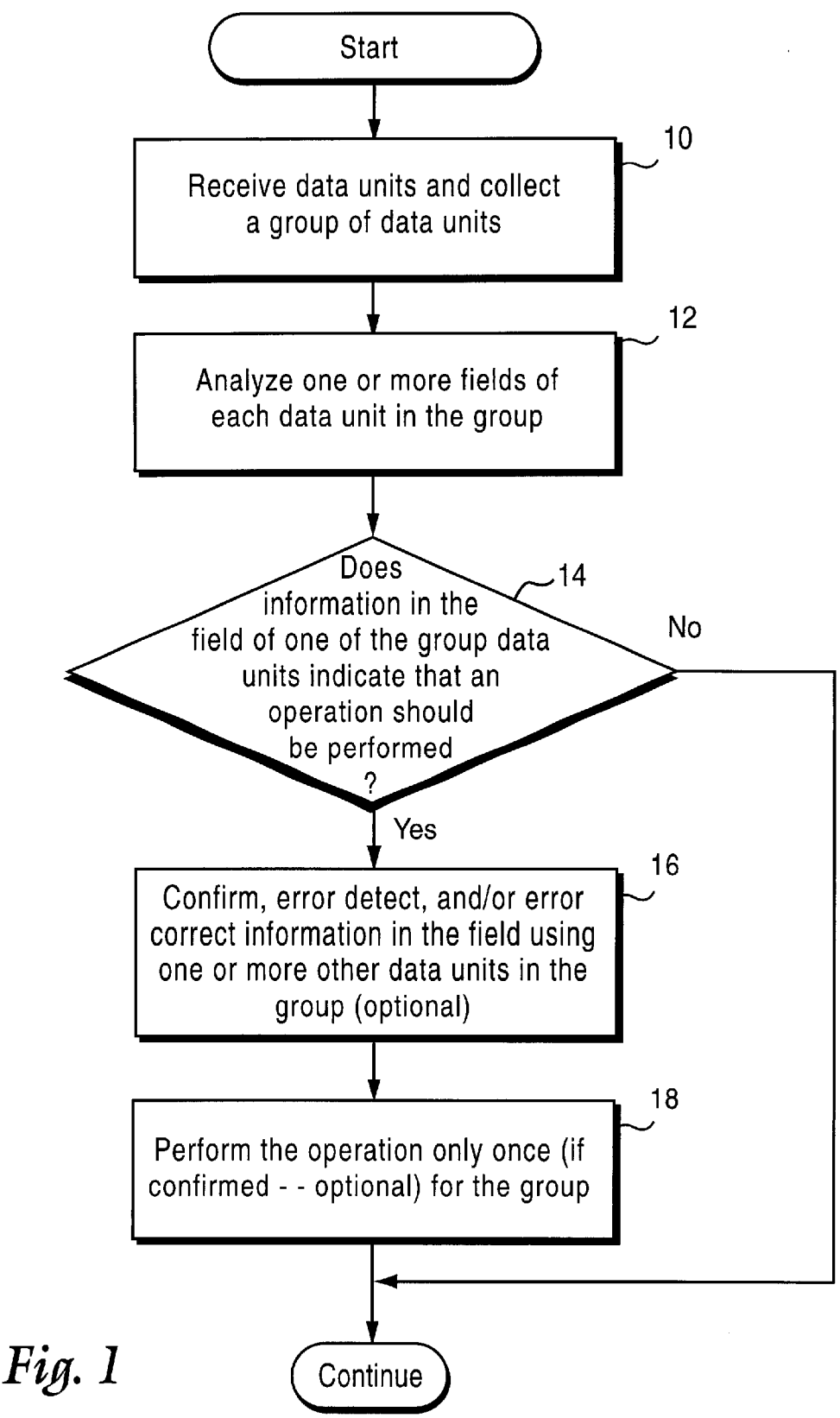
FIG. 1 is a flowchart illustrating procedures for implementing the present invention in one example embodiment.

FIG. 1 illustrates in flowchart format a method in accordance with one example embodiment of the present invention. Initially, a transmitter transmits as a group or a set two or more data units. Each of the data units may include data bit fields for carrying "data" information, "control" information, or both types of information. After transmitting these plural data units as a group over the communications channel, the receiver collects those data units as a group (block 10). One or more fields of each data unit in the received group is then analyzed (block 12). A decision is made based on that analysis whether information in the field of one of the data units in the group indicates that an operation should be performed (block 14). If not, the process continues. Otherwise, the information in that field may be used to confirm in one manner or another the information in that field of one or more other data units in the group (block 16). That confirmation may include a simple matching technique, an error detection technique, and/or an error correction technique using one or more other of the data units in the group. However, the confirmation, error detection, or error correction of information in the field is optional, and the indicated operation can be performed in an unconfirmed manner if the information in the field of only one data unit in the group indicates that the operation should be performed. On the other hand, if more than one of the data units includes a field that indicates that the same operation should be performed, that operation is only performed once for the entire group (block 18).

Figure 2:
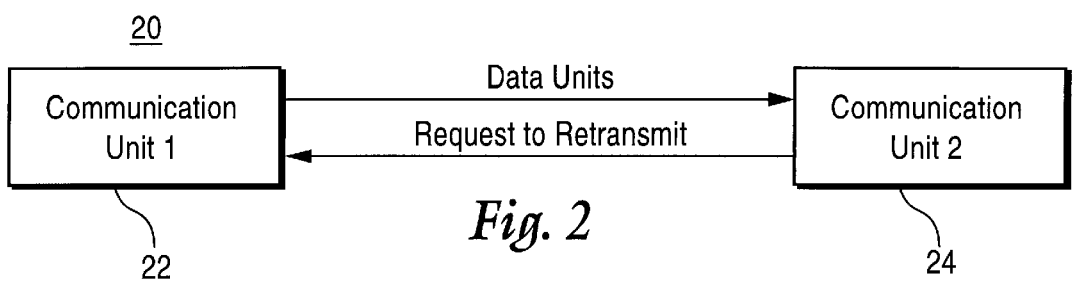
FIG. 2 is a diagram of an example communications system in which the present invention may be employed.

FIG. 2 illustrates a communications system 20 including a first communications unit 22 and a second communications unit 24. Units of data are communicated from the first communications unit 22 to the second communications unit 24 over an appropriate communications medium/channel. A non-limiting example of a data unit is a protocol data unit (PDU); however, smaller, larger, or differently formatted data units are also applicable. A group of two or more data units from the first communications unit 1 may include the same field. In the following non-limiting example, that field is a polling request which requests that the receiving communications unit 24 acknowledge whether each of the transmitted PDUs has been successfully received. If the communications unit 24 detects that one or more of the data units has not been received or has been received erroneously, it sends a negative acknowledgment message to the communications unit 22 requesting retransmission of those one or more detected data units. Preferably, although not necessarily, the receiving communications unit 24 performs the polling response if just one of the data units in the group sent by the communications unit 22 includes a polling request. Also preferably, but not necessarily, unit 24 performs the polling request only once, even if two or more data units in the group include a polling request.

Figure 3:
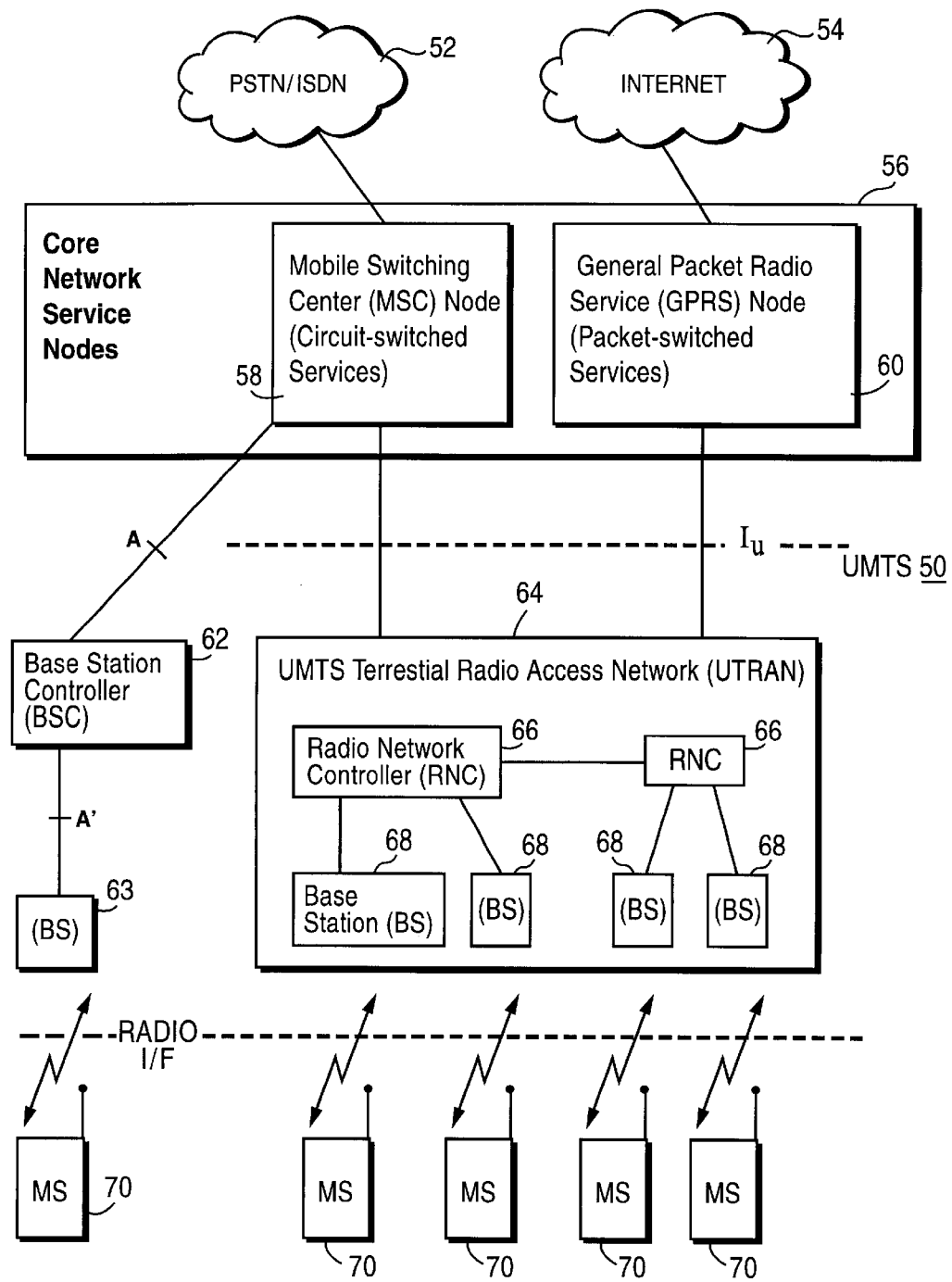
FIG. 3 is a function block diagram illustrating an example wideband code division multiple access (WCDMA) radio communications system where the present invention may be advantageously employed.

One advantageous application of the invention using the polling field example is now described in the context of the universal mobile telecommunications system (UMTS) 50 shown in FIG. 3. A representative, connection-oriented, external core network, shown as a cloud 52, may be for example the Public Switched Telephone Network (PSTN) and/or the Integrated Services Digital Network (ISDN). A representative, connectionless-oriented, external core network, shown as a cloud 54, may be for example the Internet. Both core networks are coupled to corresponding service nodes 56. The PSTN/ISDN connection-oriented network 52 is connected to a connection-oriented service node shown as a mobile switching center (MSC) node 58, that provides circuit-switched services. In the existing GSM model, the mobile switching center 58 is connected over an interface A to a base station controller (BSC) 62 which in turn is connected to a radio base station 63 over interface A'. The Internet connectionless-oriented network 54 is connected to a General Packet Radio Service (GPRS) node 60 tailored to provide packet-switched type services.

Each of the core network service nodes 58 and 60 connects to a UMTS Terrestrial Radio Access Network (UTRAN) 64 over a UTRAN interface ($I_U$). The UTRAN 64 includes one or more radio network controllers 26. Each RNC 66 is connected to a plurality of base stations (BS) 68 and to any other RNCs in the UTRAN 64. Radio communications between the base stations 68 and mobile radio stations (MS) 70 are by way of a radio interface. Radio access is based on wideband-CDMA (WCDMA) with individual radio channels allocated using WCDMA spreading codes. WCDMA provides the wide bandwidth for multimedia services and other high rate demands as well as robust features like diversity handoff and RAKE receivers to ensure high quality.

Figure 4:
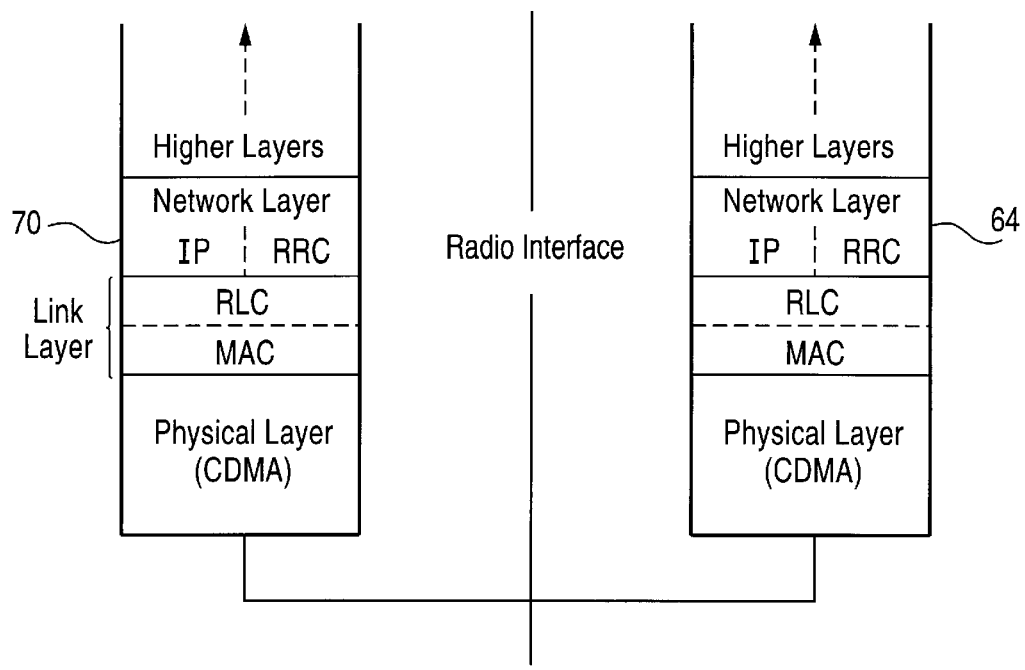
FIG. 4 is a diagram illustrating several lower level communication protocol layers that may be employed in the system shown in FIG. 3.

The radio interface shown in FIG. 3 is divided into several protocol layers, with several lower level layers illustrated in FIG. 4. In particular, a mobile station 70 uses these protocol layers to orchestrate communication with similar protocol layers in the UTRAN 64. Both protocol stacks include: a physical layer, a data link layer, and a network layer. The data link layer is split into two sublayers: a radio link control (RLC) layer and a medium access control (MAC) layer. The network layer is divided in this example into a control plane protocol (RRC) and a user plane protocol (IP).

The physical layer provides information transfer services over the air interface using wideband CDMA performing the following functions: forward error correction encoding and decoding, macrodiversity distribution/combining, soft handover execution, error detection, multiplexing and demultiplexing of transport channels, mapping of transport channels onto physical channels, modulation and spreading/ demodulation and despreading of physical channels, frequency and time synchronization, power control, RF processing, and other functions.

The medium access control (MAC) layer provides unacknowledged transfer of service data units (SDUs) between peer MAC entities. The MAC functions include selecting an appropriate transport format for each transport channel depending on data rate, priority handling between data flows of one user and between data flows of different users, scheduling of control messages, multiplexing and demultiplexing of higher layer PDUs, and other functions. The RLC performs various functions including the establishment, release, and maintenance of an RLC connection, segmentation and reassembly of variable length, higher layer PDUs into/from smaller RLC PDUs, concatenation, error correction by retransmission (ARQ), in sequence delivery of higher layer PDUs, duplicate detection, flow control, and other functions.

The control plane part of the network layer in the UTRAN consists of a radio resource control protocol (RRC). The RRC protocol handles the control signaling over the radio interface, e.g., radio access bearer control signaling, measurement reporting and handover signaling. The user plane part of the network layer includes the traditional functions performed by layer 3 protocols such as the well known Internet Protocol (IP).

Figures 5A, 5B, 7:
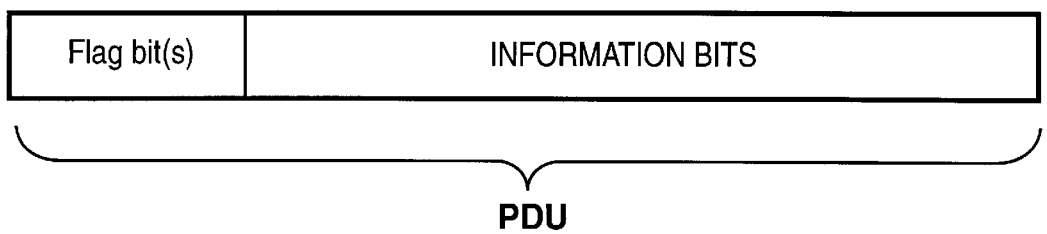
FIGS. 5A and 5B are diagrams illustrating example protocol data units (PDUs) that may be used in the example WCDMA radio communications system of FIG. 3.
FIG. 7 is a diagram illustrating another example embodiment of the invention using a general PDU.

The radio link control (RLC) protocol layer includes an Automatic Repeat Request (ARQ) mechanism. An RLC transmitter receives user data and segments and transforms it into RLC PDUs. An example of an RLC PDU is shown in FIG. 5A. The first PDU field "U/C" corresponds to user/control data and indicates whether the transmitted message is a data PDU or a control PDU. The "P" field corresponds to a polling field containing a bit which is set to "1" when the transmitter wants a status report of proper receipt of this PDU from the receiver. The "Sequence Number" field indicates the sequence number of a data PDU and is increased by one for each new data PDU. The data field contains segments of higher level data information. Optional "Length Indicator" and extension "E" fields may also be included.

In response to a PDU in which the polling bit P is set to "1", the receiver may send a status report including a selective acknowledgment (SACK) PDU having for example the format shown in FIG. 5B. The SACK PDU indicates which data PDUs have been properly received. It is possible in the SACK to give acknowledgments and negative acknowledgments of several data PDUs. As above, the "U/C" field indicates whether the transmitted message is a data PDU or a control PDU. The "LRSN" field corresponds to a Latest Received Sequence Number that indicates the sequence number of the latest received data PDU. The optional "E" field corresponds to an extension field. The "Starting Sequence Number" (SSN) field indicates the sequence number of the last PDU before a missing PDU. The "Bitmap" field is a variable length field which indicates the erroneous or missing data PDUs between a first received sequence number and a starting sequence number. If the SSN and bitmap fields are not included, the SACK PDU acknowledges data PDUs with a sequence number less than or equal to LRSN.

Figure 6:
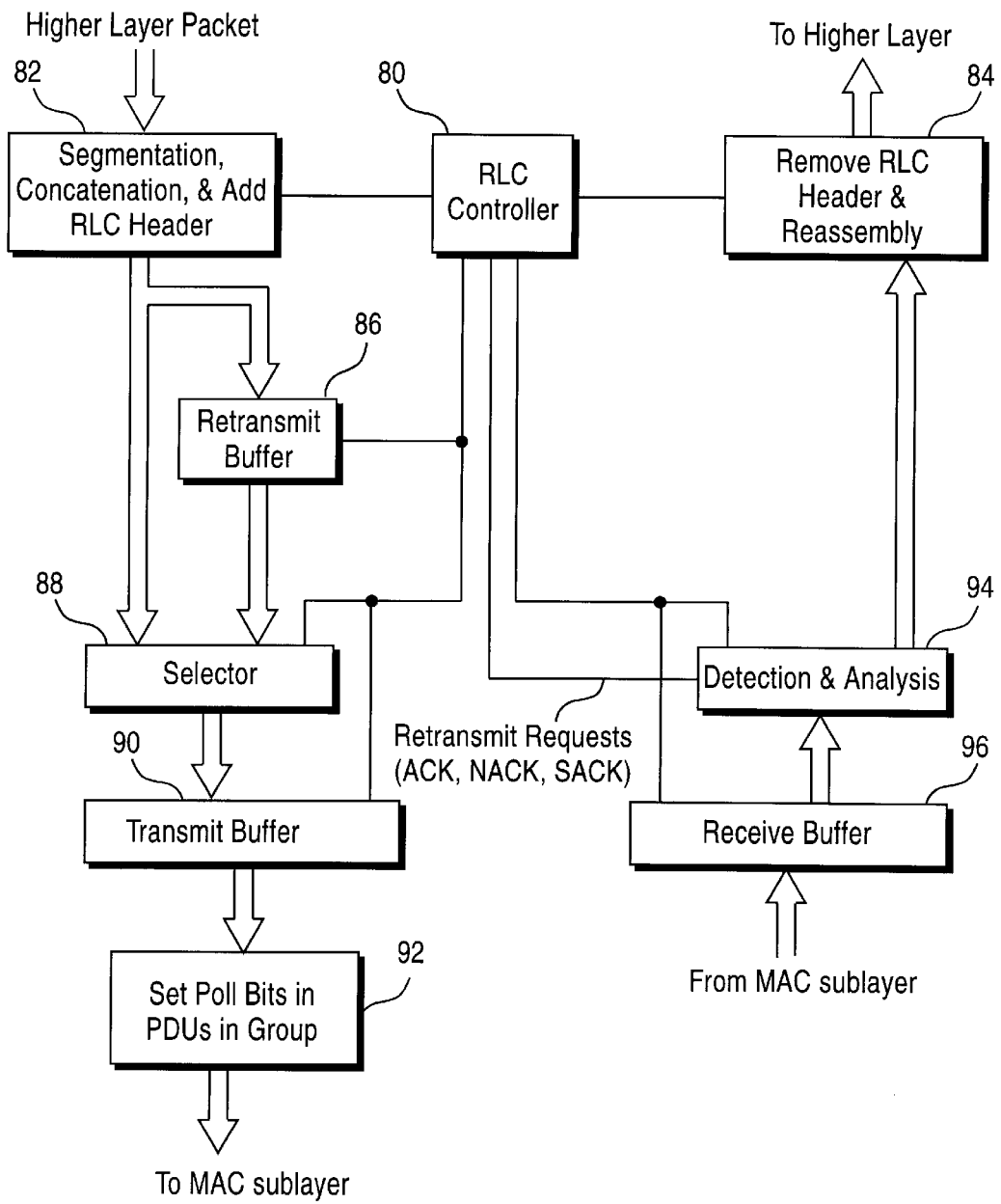
FIG. 6 is a function block diagram illustrating an example implementation of the present invention in the context of the system shown in FIG. 3.

FIG. 6 shows a function block diagram of an example implementation of the present invention in the RLC layer of a UMTS entity such as the mobile station 70 or an RNC 66 shown in FIG. 3. In this RLC layer implementation, the overall operation and functions are supervised and generally controlled by the RLC controller 80. Although specific function blocks are shown in FIG. 6, those functions may be performed using any suitable hardware and/or software.

On the transmit side of the communication entity at the RLC layer, higher layer packets are received in a segmentation, concatenation, and add RLC header block 82. The higher layer packets are segmented and/or concatenated to PDUs of fixed length. The PDU length is decided with a particular radio access network service established for communication involving a particular mobile station. Once the RLC header is added to each PDU, they are stored both in a retransmit buffer 86 and in a transmit buffer 90 via selector 88. The PDUs stored in the transmit buffer 90 are then transmitted in accordance with flow control signals from the RLC controller 80 to the lower MAC layer for transmission via the physical layer to the receiver over the radio interface. When a request to retransmit one or more PDUs is received, (e.g., ACK, NACK, or SACK), the RLC controller 80 controls selector 88 to select PDUs stored in the retransmit buffer 86 for transmission via the transmission buffer 90. A polling bit (P) may be set in block 92 if an acknowledgment is desired from the receiver.

In this WCDMA example, information contained in a "logical connection" between the UTRAN 64 and a mobile 70 may be transported over the radio interface using a physical radio channel divided into specific time intervals allocated to carry the traffic for that connection. The number of PDUs that may be sent during a specific time interval may be more than one, and that number may also vary during the lifetime of the connection. Depending on the transmission rate selected for the connection, different numbers of PDUs are transmitted during one physical channel time interval. For a faster rate, more PDUs are transmitted, and for a slower rate, fewer PDUs are transmitted during that time interval. In any event, because PDUs are preferably formatted to have a relatively short length, e.g., longer length PDUs are more likely to be corrupted, it is often the case that plural PDUs are transmit as a group during a single transmission time interval.

On the receive side of the communication entity at the RLC layer, the PDUs transported during the connection's time interval are delivered up from the physical layer 1 to the media access channel (MAC) sublayer at level 2. From a logical channel at the level 2 MAC sublayer, the PDUs in the group received for a transmission time interval are placed in a receive buffer 96 and then processed by a PDU detection and analysis block 94. Block 94 forwards properly received PDUs to block 84 where the RLC headers are removed from the PDUs, and the PDUs are reassembled into higher layer packets which are then delivered to higher protocol layers.

The PDU detection and analysis block 94 determines whether the polling bit of any one of a group of received PDUs in the recently received time interval is set. If the polling bit is set for one or more PDUs in the group, block 94 initiates via RLC controller 80 the sending of an ACK, NACK, or SACK message to the transmitter regarding the status of receipt of the PDUs in that group. If the detection and analysis block 94 detects that a PDU is either missing or erroneously received, a retransmit request signal is generated, e.g., in the form of (1) a negative acknowledgment (ACK/NACK), (2) a selective acknowledgment (SACK) message shown in FIG. 5B, or (3) some other message format. That retransmit request is forwarded to the transmit buffer 90. Retransmit requests receive priority via control signal from the RLC controller 80 over other PDUs waiting to be transmit.

Of course, the present invention is not limited to polling fields or to a particular communications protocol layer. Indeed, the invention is applicable to other data unit fields and/or communications protocol layers. FIG. 7 for example shows another embodiment with a more general format of a data unit field. The data unit field includes one or more flag or other indicator bits along with substantive information bits. If the transmitter determines that the substantive information is to be communicated in a particular field of one data unit in a group of data units, the transmitter uses unused, similar data unit fields of other data units in that same group to convey that same substantive information to improve the chances of the receiver actually properly receiving that substantive information. If a data unit field contains redundant substantive information, the transmitter sets that data unit field's flag bit.

After receiving the group of data units transmitted together, the receiver detects the set flag in one or more of the data units in the group, decodes the redundant substantive information, and takes the appropriate action corresponding to the redundant substantive information. However, the receiver only performs the requested action corresponding to the substantive information once per received data unit group. Reliability is improved because if one of the data units in the group carrying the substantive information is not received properly by the receiver, another data unit in the group that contains the same substantive information may nevertheless be properly received. Of course, if the receiver has already properly received the substantive information, it can ignore the redundant substantive information conveyed by the other data units in the group.

While the present invention has been described with respect to a particular embodiment, those skilled in the art will recognize that the present invention is not limited to any specific embodiment described or illustrated herein. Different formats, embodiments, and adaptations besides those shown and described as well as many modifications, variations, and equivalent arrangements may also be used to implement the invention. It is to be understood that this disclosure is only illustrative and exemplary of the present invention.

What is claimed is:

1. A method for improving the reliability of data communications comprising:

analyzing, as group, a data field provided in each one of plural received data units, where information in the data field in plural ones of the data units in group indicates that a data processing or a data communications operation should be performed, and performing the operation only once for the group of received data units even though inflation in the data field in more than one of the data units in the group indicates that the operation should be performed.

2. The method in claim 1, wherein the field is a polling field, the information is a poll request, and the operation is transmission of status information.

3. The method in claim 2, wherein the polling request and the status information relate to whether one or more previously transmitted data units has been received.

4. The method in claim 3, wherein the polling request is used to request that a receiver of the data unit acknowledge receipt of the data unit to a transmitter of the data unit, and wherein the status information includes a positive acknowledgment or a negative acknowledgment that the one or more previously transmitted data units has been properly received.

5. A method for improving the reliability of the data communications comprising:

analyzing, as group, a data field provided in each one of plural received data units, performing an operation it information in the data field of just one of the data units in the group indicates that the operation should be performed, and using information in the data field in plural ones of the data units in the group to increase the reliability of the transmission of the information.

6. A method for improving the reliability of the data communications comprising:

analyzing, as group, a data field provided in each one of plural received data units, performing an operation if information in the data field of just one of the data units in the group indicates that the operation should be performed, and wherein the group includes plural data units that are transmitted during one transmission time interval.

7. A method for improving the reliability of the data communications comprising:

analyzing, as group, a data field provided in each one of plural received data units, performing an operation if information in the data field of just one of the data units in the group indicates that the operation should be performed, transmitting the group of data units during a specified time interval, and setting a flag in the data field of plural data units in this group.

8. The method in claim 1, further comprising:

detecting at a receiver of the group of data units, a status of the data field flag in each of the data units in the group to determine whether to process the remainder of the corresponding data field.

9. In a radio communications system where protocol data units (PDUs) are communicated over a radio communications channel between a transmitter and a receiver, a method comprising:

(a) detecting plural PDUs transmitted by the transmitter to the receiver;

(b) analyzing a polling field provided in each one of the plural PDUs; and (c) transmitting polling information to the transmitter if information in the polling field of just one of the PDUs requests a poll; and (d) using information in the polling fields in the plural PDUs to increase the reliability of the transmission of the information.

10. The method in claim 9, wherein the steps (a)–(c) are performed in a radio link control layer of the receiver.

11. The method in claim 9, wherein the polling information indicates whether a PDU is acknowledged as received or not acknowledged as received.

12. The method in claim 9, wherein information in the polling field in the plural PDUs indicates that polling information should be transmitted by the receiver to the transmitter, the method further comprising:

transmitting the polling information only once for the plural PDUs even if information in more than one of the polling fields in the plural PDUs indicates that polling information should be transmitted.

13. A method for improving the reliability of data communications comprising:

analyzing, as group, a data field provided in each one of plural received data units;

performing an operation if information in the data field of just one of the data units in the group indicates that the operation should be performed; and wherein the plural data units are transmitted by the transmitter as a group during one transmission time interval.

14. A method for improving the reliability of data communications comprising:
- analyzing, as group, a data field provided in each one of plural received data units;
- performing an operation if information in the data field of just one of the data units in the group indicates that the operation should be performed; and
- if a polling bit is to be set in the polling field of one data units in the group, setting a poll bit in the polling field of other data units in the group.

15. A radio communications unit, comprising:
- receiving circuitry for receiving a radio signal containing a group of protocol data units (PDUs);
- a processor for analyzing a polling field provided in each one of the PDUs in the group; and
- a transmitter for transmitting status information if information in the polling field of just one of the PDUs in the group requests a poll;
- wherein information in the polling fields in plural PDUs in the group indicates that status information should be transmitted, and the transmitter is configured to transmit status information only once for the plural PDUs even if information in more than one of the polling fields in the plural PDUs in the soup indicates that the transmitting of status information should be performed.

16. The radio communications unit in claim 15, wherein the processor analyzes the polling fields at a radio link control protocol layer.

17. The radio communications unit in claim 15, wherein the status information indicates whether a PDU is properly received.

18. The radio communications unit in claim 15, wherein the reliability of the transmission of polling field information in one of the plural PDUs in the group is improved by repeating that polling field information in the polling field of another PDU in the group.

19. The radio communications unit in claim 15, wherein the plural PDUs in the group are received during one transmission time interval.

20. A radio communications unit, comprising:
- processing circuitry for analyzing a polling bit in a polling field in one of a group of plural protocol data units (PDUs) to be transmitted over a radio channel during a transmission time interval, and if the polling bit is set for the one PDU, setting the polling bit in the polling field of at least one other PDU in the group,
- a transmitter for transmitting the group of PDUs during the one transmission time interval,
- wherein a set polling bit indicates that a status report should be provided by a receiver of the group of PDU.

21. The radio communications unit in claim 20, wherein the processor analyzes the polling fields at a radio link control protocol layer.

22. The radio communications unit in claim 20, wherein the number of PDUs in the group depends on the rate at which the PDUs are to be transmitted over the radio channel.

* * * * *

UNITED STATES PATENT AND TRADEMARK OFFICE
CERTIFICATE OF CORRECTION

PATENT NO. : 6,643,813 B1
DATED : November 4, 2003
INVENTOR(S) : Johansson et al.

It is certified that error appears in the above-identified patent and that said Letters Patent is hereby corrected as shown below:

Column 7,
Line 46, "inflation" should read -- information. --
Line 65, "it" should read -- if. --

Signed and Sealed this

Thirteenth Day of April, 2004

JON W. DUDAS
*Acting Director of the United States Patent and Trademark Office*